US000001042H

United States Statutory Invention Registration [19]

[11] Reg. Number: H1042

[43] Published: Apr. 7, 1992

Sasaki et al.

[54] THERMOPLASTIC RESIN COMPOSITIONS

[76] Inventors: Isao Sasaki, c/o Central Research Laboratories Mitsubishi Rayon Co., Ltd., 20-1, Miyukicho, Otake-shi, Hiroshima-ken, 739-06; Kozi Nishida, c/o Toyama Plants Mitsubishi Rayon Co., Ltd., Kaigandori 3, Toyama-shi, Toyama-ken, 931; Masaharu Fujimoto, c/o Central Research Laboratories Mitsubishi Rayon Co., Ltd., 20-1, Miyukicho, Otake-shi, Hiroshima-ken, 739-06, all of Japan

[21] Appl. No.: 431,391

[22] Filed: Nov. 3, 1989

[30] Foreign Application Priority Data

Nov. 7, 1988 [JP] Japan ..... 63-279283
Nov. 11, 1988 [JP] Japan ..... 63-283835

[51] Int. Cl.[5] ..... C08F 8/00; C08L 35/00

[52] U.S. Cl. ..... 525/131; 525/205; 525/227

[58] Field of Search ..... 525/131, 205, 227

[56] References Cited

U.S. PATENT DOCUMENTS 4,045,382 8/1977 Braese et al. ..... 525/133 X
4,255,322 3/1981 Kopchik ..... 525/205

FOREIGN PATENT DOCUMENTS 0101026 9/1978 Japan ..... 525/227
0115338 7/1984 Japan ..... 525/227
1009459 1/1986 Japan ..... 525/227

*Primary Examiner*—Robert L. Stoll
*Assistant Examiner*—Philip Tucker

[57] ABSTRACT

Disclosed herein are thermoplastic resin compositions. They contain, a principal components, (A) a methacrylimide-containing polymer containing at least 10% by weight of methacrylimide units represented by the following formula (1):

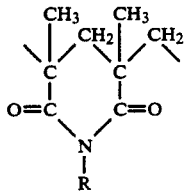

(1)

wherein R represents a hydrogen atom or an aliphatic, aromatic or alicyclic hydrocarbon group having 1–20 carbon atoms, and (B) at least one polymer selected from the group consisting of (B-1) chlorinated polyolefins and (B-2) thermoplastic polyurethanes.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMOPLASTIC RESIN COMPOSITIONS

BACKGROUND OF THE INVENTION

1.) Field of the Invention

This invention relates to thermoplastic resin compositions, which comprise as principal components a methacrylimide-containing polymer and at least one polymer selected from the group consisting of chlorinated polyolefins and thermoplastic polyurethanes and have excellent heat resistance, impact resistance and formability/moldability (hereinafter collectively referred to as "moldability" for the sake of brevity).

2.) Description of the Related Art

Methacrylimide-containing polymers have a high heat distortion temperature and excellent stiffness, surface hardness, moldability and the like but have low mechanical strength typified by impact strength. Under the circumstances, a substantial limitation is thus imposed on their application fields when employed solely as molding materials.

On the other hand, chlorinated polyolefins are well-known as thermoplastic elastomers having superb impact resistance, chemical resistance and flame retardancy. They are also known to have many excellent properties. It is however extremely rare that such chlorinated polyolefins are employed singly. They are generally used as flame retardants, sealants, roofing materials, and additives for vinyl chloride resins. Their applications have therefore been limited.

Further, thermoplastic polyurethanes are well-known as thermoplastic elastomers having excellent mechanical strength, abrasion resistance and oil resistance. They are also known to have many other good properties. These thermoplastic polyurethanes are however often used singly as thermoplastic elastomers and their application fields are relatively limited.

SUMMARY OF THE INVENTION

The present inventors have conducted an investigation with a view toward developing resin compositions in which these resins mutually compensate their drawbacks. As a result, it has been found that blending of these resins at a particular ratio can significantly improve the mechanical properties, especially impact strength and moldability, of such methacrylimide-containing polymers while retaining their excellent properties, leading to the completion of this invention.

An object of this invention is therefore to provide a thermoplastic resin composition with improved moldability and impact resistance while retaining the excellent thermal properties and stiffness of a methacrylimide-containing polymer.

In one aspect of this invention, there is thus provided a thermoplastic resin composition comprising as principal components:

(A) 1–99 parts by weight of a methacrylimide-containing polymer containing at least 10% by weight of methacrylimide units represented by the following formula (1):

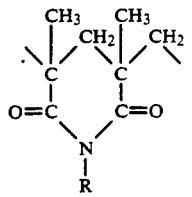

(1)

wherein R represents a hydrogen atom or an aliphatic, aromatic or alicyclic hydrocarbon group having 1–20 carbon atoms; and (B) 99–1 parts by weight of at least one polymer selected from the group consisting of (B-1) chlorinated polyolefins and (B-2) thermoplastic polyurethanes.

Using the composition of this invention as a powder, chips or in any other shape, various useful formed or molded articles can be produced by conventional processes for the formation or molding of plastics, such as press forming, injection molding, blow molding and extrusion. Owing to the blending of the methacrylimide-containing resin and at least one of chlorinated polyolefins and thermoplastic polyurethanes, the resin composition has excellent mechanical properties, heat resistance and moldability.

DETAILED DESCRIPTION OF THE PREFERRED EMBODIMENTS

The methacrylimide-containing polymer (A) useful in the practice of this invention is a polymer or copolymer containing cyclic imide units represented by the formula (1).

As long as such cyclic imide units are contained in a proportion of at least 10% by weight, it is possible to use any methacrylimide-containing polymer irrespective of its chemical structure. However, those represented by the formula (1) in which R stands for a hydrogen atom or a methyl, ethyl, propyl, butyl or phenyl group are more common.

No particular limitation is imposed on the process for the production of the methacrylimide-containing polymer. It is however advantageous to form imide rings, for example, by reacting polymethyl methacrylate with a primary amine such as ammonia, methylamine or ethylamine at 170°–350° C. in an autoclave while using a suitable solvent, e.g., an aromatic hydrocarbon such as benzene, toluene, xylene or ethylbenzene or an alcohol such as methanol, ethanol or butanol, or a mixed solvent of two or more solvents selected therefrom. Further, the reaction may be conducted in an extruder as disclosed in Japanese Patent Laid-Open No. 63989/1977.

It is essential that at least 10% by weight of cyclic imide units represented by the formula (1) be contained in the polymer. Any proportions smaller than 10% by weight are too small to exhibit the inherent heat resistance of the methacrylimide-containing polymer.

It is well-known that imidation reaction intermediates such as methacrylic acid groups and acid anhydride groups are by-produced in the resulting polymer when the above production process is employed (for example, Japanese Patent Laid-Open No. 89705/1987). To control the amounts of such by-products, a methyl methacrylate-methacrylic acid copolymer may be used in addition to polymethyl methacrylate as one of raw materials other than varying the reaction condition such as reaction temperature. This is a preferred process.

For the production of a resin composition according to this invention, the total concentration of acid groups and an acid anhydride groups derived from the above-described by-products contained in the methacrylimide-containing polymer is preferably 1.2 milli-equivalents per gram or less. Total contents greater than 1.2 millie-quivalents per gram tend to result in resin compositions impaired in water resistance.

The chlorinated polyolefin (B-1) employed in this invention is a thermoplastic elastomer which is obtained by reacting a polyolefin and chlorine. Specific examples of the chlorinated polyolefin typically include chlorinated polyethylenes and chlorinated polypropylenes. Depending on the degree of chlorination, they may be classified into either low-chlorination or high-chlorination type. For use in the practice of this invention, low-chlorination polyolefins having a degree of chlorination not higher than 40% are preferred.

As the chlorinated polyolefin (B-1), two or more chlorinated polyolefins of different kinds and/or of different degrees of chlorination can be used in combination.

As the thermoplastic polyurethane (B-2) used in this invention, those having properties as thermoplastic elastomers are preferred. Exemplary thermoplastic polyurethanes (B-2) as thermoplastic elastomers include (a) the caprolactone (or caproester) type, (b) the polytetramethylene glycol type, and (c) the adipic acid type. Thermoplastic polyurethanes of the caprolactone type can each be obtained by subjecting a polylactonepolyol, which has been obtained by ring-opening caprolactone, to addition polymerization with a polyisocyanate in the presence of a short-chain polyol. On the other hand, thermoplastic polyurethanes of the polytetramethylene glycol type can each be obtained by subjecting polytetramethylene glycol, which has been obtained by ring-opening polymerization of tetrahydrofuran, to addition polymerization with a polyisocyanate in the presence of a short-chain polyol. In addition, thermoplastic polyurethanes of the adipic acid type can each be obtained by subjecting a polyol adipate of adipic acid and a glycol to addition polymerization with a polyisocyanate in the presence of a short-chain polyol.

Whichever the type is, a thermoplastic polyurethane elastomer is composed of soft segments and hard segments and has high flexibility and excellent moldability, abrasion resistance, mechanical properties and oil resistance.

In the present invention, two or more of these thermoplastic polyurethanes (B-2) can be used in combination.

The thermoplastic resin composition according to this invention can be produced by blending, as principal components, (A) 1–99 parts by weight of the methacrylimide-containing polymer and (B) 99–1 parts by weight of at least one polymer selected from (B-1) chlorinated polyolefins and (B-2) thermoplastic polyurethanes.

To avoid impairment to the heat resistance of the methacrylimide-containing polymer and the mechanical properties of the chlorinated polyolefin, it is preferred to blend, as principal components, (A) 5–95 parts by weight of the methacrylimide-containing polymer and (B) 95–5 parts by weight of at least one polymer selected from (B-1) chlorinated polyolefins and (B-2) thermoplastic polyurthanes. It is most preferred to blend (A) 10–90 parts by weight of methacrylimide-containing polymer and (B) 90–10 parts by weight of at least one polymer selected from (B-1) chlorinated polyolefins and (B-2) thermoplastic polyurethanes.

Blending of the methacrylimide-containing polymer (A) with said at least one polymer (B) selected from the chlorinated polyolefins (B-1) and the thermoplastic polyurethanes (B-2) can be conducted, for example, by melting and mixing the individual components, each of which may be in the form of granules, powder or chips, in a V-type blender, a super mixer, a kneader or the like and then forming the resultant blend into chips.

The resin composition of this invention may be added with an anti-pyrolysis agent and/or an ultraviolet absorber so as to improve its heat resistance, light resistance and oxidative deterioration resistance. Further, plasticizers, pigments, lubricants and the like can also be used. It is also possible to add a fibrous material such as glass fibers or carbon fibers to reinforce the composition.

It is also possible to further improve mechanical properties, led by impact strength, by incorporating as an impact strength modifier up to about 40% by weight, based on the whole resin composition, of a high-impact resin such as an acrylonitrile-butadiene-styrene terpolymer (ABS resin), methyl methacrylate-butadienestyrene terpolymer (MBS resin), ethylene-propylene-diene terpolymer rubber (EPDM) - acrylonitrile-styrene graft polymer (AES resin), or of a rubbery polymer, for example, thermoplastic elastomer such as an ethylenic ionomer resin, a modified polyethylene containing glycidyl ester groups, a polyether ester, a polyether ester amide or a polyether amide.

In addition, one or more other polymers may be blended in a small amount (up to about 20% by weight based on the whole resin composition) to adjust various properties of the resin compositions as desired. Examples of such other polymers include styreneacrylonitrile copolymer (AS resin), styrene-methyl methacrylate-acrylonitrile copolymer, α-methylstyrenestyrene-acrylonitrile copolymer, etc.

The present invention will hereinafter be described specifically by the following examples.

All designations of "part" or "parts" and "%" as will be used in the following examples mean part or parts by weight and % by weight. Heat distortion temperatures were measured in accordance with ASTM D-648-56 (load: 18.56 kg/cm$^2$) while Izod impact strengths were measured in accordance with ASTM D-256-56, Method A. Further, the melt index (MI) of each composition was measured in accordance with ASTM D-1238.

Measurement of the degree (%) of imidation of each methacrylimide-containing polymer (A) was conducted in the following manner.

The nitrogen content of the methacrylimide-containing polymer (A) was determined from its elemental analysis data (analyzer: "CHN Corder (MT-3)", trade name; manufactured by Yanagimoto Seisaku-Sho, Ltd.). Further, the methacrylimide-containing polymer (A) was also analyzed at 100 MHz by a H+-NMR spectrometer ("JNM-FX-100", trade name; manufactured by JEOL, Ltd.). The term "imidation degree" as used herein means the value of x as expressed in terms of percentage (%), said x being determined by assuming that the methacrylimide-containing polymer (A) consists of recurring units composed of methyacrylimide structural unit and methyl methacrylate unit represented in combination by the following structural formula:

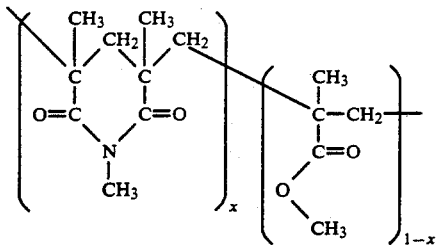

Determination of x was effected based on the nitrogen content found from the data of the elemental analysis and the integral ratio of the methyl resonance of >N—$CH_3$ to that of -(O—$CH_3$) obtained from the data of $H^+$-NMR analysis.

Measurement of the total concentration of acid groups and acid anhydride groups in each methacrylimide-containing polymer (A) was conducted in the following manner.

A predetermined amount of the polymer (A) was weighed and then dissolved in 50 ml of dimethylformamide. A 0.1 N solution of caustic potassium in methanol was added with stirring. The total concentration of acid groups and acid anhydride groups was determined in terms of milliequivalents by neutralization titration which relied upon electrical conductivity.

Measurement of the intrinsic viscosity of each methacrylimide-containing polymer (A) was effected in the following manner.

Using a Deereax-Bishoff viscometer, the time ($t_s$) of flow of a 0.5% by weight chloroform solution of the sample polymer and the time ($t_0$) of flow of chloroform were measure at 25°±0.1° C. The relative viscosity, $\eta_{rel}$, of the polymer was next determined from the ratio $t_s/t_0$. Thereafter, the intrinsic viscosity was calculated in accordance with the following formula:

$$\text{Intrinsic viscosity} = \lim_{C \to 0} (\ln \eta_{rel}/C)$$

wherein C is polymer concentration (g/100 ml).

SYNTHESIS EXAMPLE 1

Into a 10-liter reactor fitted with a paddled spiral stirrer, a pressure gauge, a sample pouring vessel and a jacket heater, 100 parts of polymethyl methacrylate (PMMA; intrinsic viscosity: 0.51), 90 parts of toluene and 10 parts of methanol were charged. The contents were heated to 250° C. and stirred at the same temperature to dissolve PMMA. Then, 21.7 parts of methylamine (molar ratio to methyl methacrylate units in PMMA: 0.7) were added, followed by a reaction under heat for 3 hours at an internal pressure of 60 kg/cm$^2$G. After the reaction, a methacrylimide-containing polymer (A-1) was obtained. Polymer A-1 was dried and then formed into a powder to provide a sample. The imidation degree of Polymer A-1 was 70% and the concentration of acid groups was 0.45 milliequivalent per gram.

SYNTHESIS EXAMPLE 2

A methacrylimide-containing polymer (A-2) was obtained in exactly the same manner as in Synthesis Example 1 except for the use of a 90:10 copolymer of methyl methacrylate and methacrylic acid (intrinsic viscosity: 0.60) in place of the poly(methyl methacrylate). The imidation degree of Polymer A-2 was 75% and the concentration of acid groups was 0.50 milliequivalent per gram.

SYNTHESIS EXAMPLE 3

A methacrylimide-containing polymer (A-3) was obtained in exactly the same manner as in Synthesis Example 1 except for the use of ammonia (molar ratio to methyl methacrylate units in PMMA: 0.7) in place of methylamine. The imidation degree of Polymer A-3 was 65% and the concentration of acid groups was 0.50 milliequivalent per gram.

SYNTHESIS EXAMPLE 4

A methacrylimide-containing polymer (A-4) was obtained in exactly the same manner as in Synthesis Example 1 except that PMMA having an intrinsic viscosity of 0.32 was used and the molar ratio of methyl methacrylate units to methylamine was changed to 0.5. The imidation degree of Polymer A-4 was 40%

EXAMPLES 1-7 AND COMPARATIVE EXAMPLES 1-3

The various methacrylimide-containing polymers (A-1 to A-3) produced above in Synthesis Examples 1-3 respectively and the following chlorinated polyolefins (B-1-1 to B-1-2):

B-1-1: Chlorinated polyethylene ["ELASLENE 351A(E)", trade name; low-chlorination type; degree of chlorination: 35%; product of Showa Denko K.K.]

B-1-2: Chlorinated polypropylene ["HARDLEN 35-AL", trade name; low-chlorination type; degree of chlorination: 35%; product of Toyo Kasei Kogyo Co., Ltd.] were mixed for 20 minutes in a V-type blender in accordance with the blend ratios shown in Table 1. Using an extruder having a cylinder diameter of 40 mm, the resulting blends were separately molten, mixed and injection-molded into a variety of test pieces at a cylinder temperature of 280° C. and a mold temperature of 80° C.

Physical properties were evaluated using those test pieces. The results are summarized in Table 1. Measurement results of physical properties of the methacrylimide-containing polymers (A-1 to A-3) alone are also shown.

TABLE 1

| | Blending ratio (parts) | | Physical properties of composition | | |
|---|---|---|---|---|---|
| | Methacrylimide-containing polymer (A) | Chlorinated polyolefin (B-1) | Heat distortion temperature [°C.] | Izod impact strength [kg · cm/cm$^2$] | MI (g/10 min) |
| Ex. 1 | A-1 70 | B-1-1 30 | 115 | 7 | 15 |
| Ex. 2 | A-2 70 | B-1-1 30 | 120 | 6 | 16 |
| Ex. 3 | A-3 70 | B-1-1 30 | 140 | 6 | 10 |
| Ex. 4 | A-1 70 | B-1-2 30 | 120 | 7 | 16 |
| Ex. 5 | A-3 70 | B-1-2 30 | 145 | 6 | 8 |
| Ex. 6 | A-1 80 | B-1-1 20 | 121 | 5 | 16 |

TABLE 1-continued

| | Blending ratio (parts) | | Physical properties of composition | | |
|---|---|---|---|---|---|
| | Methacrylimide-containing polymer (A) | Chlorinated polyolefin (B-1) | Heat distortion temperature [°C.] | Izod impact strength [kg · cm/cm²] | MI (g/10 min) |
| Ex. 7 | A-1 50 | B-1-1 50 | 102 | 10 | 20 |
| Comp. Ex. 1 | A-1 100 | — | 150 | 1.0 | 10 |
| Comp. Ex. 2 | A-2 100 | — | 155 | 0.7 | 8 |
| Comp. Ex. 3 | A-3 100 | — | 190 | 0.7 | 3 |

EXAMPLES 8–15

The various methacrylimide-containing polymers (A-1 to A-3) produced above in Synthesis Examples 1–3 respectively and the following thermoplastic polyurethane (B-2-1 to B-2-3):

B-2-1: Polyurethane elastomer of the caprolactone ester type ("ESTRAN E-580", trade name; product of Nippon Elastran Co., Ltd.).

B-2-2: Polyurethane elastomer of the polyether ("ESTRAN E-380", trade name; product of Nippon Elastran Co., Ltd.).

B-2-3: Polyurethane elastomer of the adipate type ("ESTRAN E-180", trade name; product of Nippon Elastran Co., Ltd.)

were mixed for 20 minutes in a V-type blender in accordance with the blending ratios shown in Table 2. Using an extruder having a cylinder diameter of 40 mm, the resulting blends were separately molten, kneaded and injection-molded into a variety of test pieces at a cylinder temperature of 280° C. and a mold temperature of 80° C.

Physical properties were evaluated using those test pieces. The results are summarized in Table 2.

TABLE 2

| | Blending ratio (parts) | | Physical properties of composition | | |
|---|---|---|---|---|---|
| | Methacrylimide-containing polymer (A) | Thermoplastic polyurethane (B-2) | Heat distortion temperature [°C.] | Izod impact strength [kg · cm/cm²] | MI (g/10 min) |
| Ex. 1 | A-1 70 | B-2-1 30 | 120 | 5 | 12 |
| Ex. 2 | A-2 70 | B-2-1 30 | 125 | 4 | 13 |
| Ex. 3 | A-3 70 | B-2-1 30 | 140 | 4 | 9 |
| Ex. 4 | A-1 70 | B-2-2 30 | 125 | 4 | 12 |
| Ex. 5 | A-3 70 | B-2-2 30 | 145 | 3 | 6 |
| Ex. 6 | A-1 80 | B-2-1 20 | 126 | 4 | 14 |
| Ex. 7 | A-1 50 | B-2-1 50 | 109 | 8 | 18 |
| Ex. 8 | A-1 70 | B-2-3 30 | 125 | 5 | 13 |

EXAMPLES 16–23

Resin compositions were obtained by blending the methacrylimide-containing polymers (A-1 and A-3), the chlorinated polyolefin (B-1-1) and the thermoplastic polyurethane (B-2-1) with the following components (C-1 and C-2) as impact strength improving components:

C-1: Graft copolymer obtained by polymerizing 30 parts of styrene and 10 parts of acryronitrile in the presence of 60 parts of polybutadiene rubber.

C-2: Ethylene/glycidyl methacrylate copolymer containing 10 wt.% of glycidyl methacrylate units.

in accordance with the blending ratios shown in Table 3. In a manner similar to Example 1, the resultant blends were separately molten, kneaded and molded and various physical properties were evaluated. The results are also shown in Table 3.

As a result, the addition of the impact strength improving agents gave resin compositions having still better mechanical properties typified by the good heat distortion temperatures and impact strength and good moldability.

TABLE 3

| | Blending ratio (parts) | | | | Physical properties of composition | | |
|---|---|---|---|---|---|---|---|
| | Methacrylimide-containing polymer (A) | Chlorinated polyolefin (B-1) | Thermoplastic polyurethane (B-2) | Impact strength modifier (C) | Heat distortion temp. [°C.] | Izod impact strength [kg · cm/cm²] | MI (g/10 min) |
| Ex. 16 | A-1 70 | B-1-1 15 | — | C-1 15 | 117 | 18 | 14 |
| Ex. 17 | A-3 70 | B-1-1 15 | — | C-1 15 | 143 | 13 | 17 |
| Ex. 18 | A-1 70 | B-1-1 15 | — | C-2 15 | 115 | 20 | 11 |
| Ex. 19 | A-3 70 | B-1-1 15 | — | C-2 15 | 139 | 15 | 15 |
| Ex. 20 | A-1 70 | — | B-2-1 15 | C-1 15 | 122 | 15 | 13 |
| Ex. 21 | A-3 70 | — | B-2-1 15 | C-1 15 | 145 | 12 | 15 |
| Ex. 22 | A-1 70 | — | B-2-1 15 | C-2 15 | 120 | 17 | 10 |
| Ex. 23 | A-3 70 | — | B-2-1 15 | C-2 15 | 140 | 15 | 13 |

EXAMPLES 24–27 AND COMPARATIVE EXAMPLE 4

The methacrylimide-containing polymer A-4 prepared in Synthesis Example 4 was mixed with the chlorinated polyolefins B-1-1 and B-1-2 at the blending ratios given in Table 4. The resultant blends were separately molten and kneaded at 220° C. together with a stabilizier and a lubricant and then injection-molded into test pieces.

Using those test pieces, physical properties were evaluated. The results are shown in Table 4.

The measurement results of physical properties of the methacrylimido-containing polymer (A-4) are also shown.

TABLE 4

| | Blending ratio (parts) | | Physical properties of composition | |
|---|---|---|---|---|
| | Methacrylimide-containing polymer (A) | Chlorinated polyolefin (B-1) | Heat distortion temperature [°C.] | Izod impact strength [kg · cm/cm$^2$] |
| Ex. 24 | A-4 70 | B-1-1 30 | 96 | 7 |
| Ex. 25 | A-4 70 | B-1-2 30 | 100 | 7 |
| Ex. 26 | A-4 80 | B-1-1 20 | 100 | 5 |
| Ex. 27 | A-4 60 | B-1-1 40 | 92 | 12 |
| Comp. Ex. 4 | A-4 100 | — | 115 | 0.8 |

We claim:

1. A thermoplastic resin composition comprising as principal components:

(A) 1–99 parts by weight of a methacrylimide-containing polymer containing at least 10% by weight of methacrylimide units represented by the following formula (1):

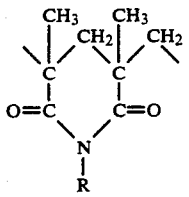

(1)

wherein R represents a hydrogen atom or an aliphatic, aromatic or alicyclic hydrocarbon group having 1–20 carbon atoms; and (B) 99–1 parts by weight of at least one polymer selected from the group consisting of (B-1) chlorinated polyolefins and (B-2) thermoplastic polyurethanes.

2. The composition of claim 1, comprising as principal components (A) 5–95 parts by weight of the methacrylimide-containing polymer and (B) 95–5 parts by weight of at least one polymer selected from the group consisting of (B-1) chlorinated polyolefins and (B-2) thermoplastic polyurethanes.

3. The composition of claim 1 or 2, wherein the methacrylimide-containing polymer (A) contains up to 1.2 milliequivalents of acid and acid anhydride groups per gram of the polymer.

4. The composition of claim 1 or 2, wherein the chlorinated polyolefin (B-1) is a chlorinated polyethylene or chlorinated polypropylene.

5. The composition of claim 1 or 2, wherein the chlorinated polyolefin (B-1) has a degree of chlorination not higher than 40% by weight.

6. The composition of any one of claims 1, 2, 7, 8 or 9, further comprising up to 40 wt. %, based on the whole comparison, of at least one impact strength modifier selected from the group consisting of acrylonitrile butadiene-styrene terpolymers, methyl methacrylate-butadiene-styrene terpolymers, ethylene-propylene-diene terpolymers, acrylonitrile-styrene graft polymers, ethylenic ionomer resins, modified polyethylene containing glycidyl ester groups, polyether esters, polyether ester amides and polyether amides.

7. The composition of claim 1, wherein the polymer (B) is a thermoplastic polyurethane.

8. The composition of claim 1, wherein the polymer (B) is a chlorinated polyethylene having a degree of chlorination of 35% by weight.

9. The composition of claim 1, wherein the polymer (B) is a chlorinated polypropylene having a degree of chlorination of 35% by weight.

* * * * *